(12) United States Patent
Simpkinson et al.

(10) Patent No.: US 12,003,585 B2
(45) Date of Patent: Jun. 4, 2024

(54) SESSION-BASED INFORMATION EXCHANGE

(71) Applicants: Vulcan Inc., Seattle, WA (US); Jo Lynn Allen

(72) Inventors: Richard Earl Simpkinson, Issaquah, WA (US); Richard Ignacio Zaragoza, Issaquah, WA (US); Jeffrey Alex Kramer, Redmond, WA (US); Keith Rosema, Seattle, WA (US); Alan Caplan, Seattle, WA (US); Paul G. Allen, Mercer Island, WA (US)

(73) Assignee: Vale Group LLC, Seattle, WA (US)

( * ) Notice: Subject to any disclaimer, the term of this patent is extended or adjusted under 35 U.S.C. 154(b) by 0 days.

(21) Appl. No.: 16/435,399

(22) Filed: Jun. 7, 2019

(65) Prior Publication Data
US 2019/0379742 A1 Dec. 12, 2019

Related U.S. Application Data

(60) Provisional application No. 62/692,557, filed on Jun. 29, 2018, provisional application No. 62/682,761, filed on Jun. 8, 2018.

(51) Int. Cl.
H04L 67/14 (2022.01)
G06V 40/16 (2022.01)
H04L 67/52 (2022.01)

(52) U.S. Cl.
CPC ............ H04L 67/14 (2013.01); G06V 40/168 (2022.01); G06V 40/172 (2022.01); H04L 67/52 (2022.05)

(58) Field of Classification Search
CPC ......... H04L 67/14; H04L 67/18; H04L 67/52; G06K 9/00288; G06K 9/00268; G06F 3/01; G06F 21/32; G06F 21/30; G06V 40/168; G06V 40/172
See application file for complete search history.

(56) References Cited

U.S. PATENT DOCUMENTS

| | | | |
|---|---|---|---|
| 6,396,497 B1 | 5/2002 | Reichlen | |
| 7,720,436 B2 | 5/2010 | Hamynen et al. | |
| 8,046,719 B2 | 10/2011 | Skourup et al. | |
| 8,135,796 B1 * | 3/2012 | Slaughter | ................ H04L 41/22 709/217 |
| 8,643,951 B1 | 2/2014 | Wheeler et al. | |

(Continued)

OTHER PUBLICATIONS

International Invitation to Pay Additional Fees dated Aug. 26, 2019, Patent Application No. PCT/US2019/036181, filed Jun. 7, 2019, 21 pages.

(Continued)

Primary Examiner — Kristie D Shingles
(74) Attorney, Agent, or Firm — Davis Wright Tremaine LLP

(57) ABSTRACT

Information sharing is initiated between devices based on identification, by one or more of the devices, of a context in which the information is to be shared. Services to provide the shared information are identified based on a mutually agreed level of sensitivity for the information sharing. Information is shared between the devices via the services. Use of the services to share information is stopped in response to a change in context identified by one or more of the devices.

20 Claims, 8 Drawing Sheets

(56) References Cited

U.S. PATENT DOCUMENTS

| | | | |
|---|---|---|---|
| 8,712,441 B2* | 4/2014 | Haney | H04M 1/72418 |
| | | | 455/518 |
| 9,015,285 B1 | 4/2015 | Ebsen et al. | |
| 9,035,878 B1 | 5/2015 | Wheeler | |
| 9,390,563 B2 | 7/2016 | Hart | |
| 9,497,202 B1* | 11/2016 | Calo | G06F 16/583 |
| 9,591,427 B1 | 3/2017 | Lyren et al. | |
| 9,709,806 B2 | 7/2017 | Ishikawa et al. | |
| 9,754,168 B1 | 9/2017 | Henderson | |
| 9,916,431 B2 | 3/2018 | Hwang et al. | |
| 10,281,987 B1 | 5/2019 | Yang et al. | |
| 10,318,034 B1 | 6/2019 | Hauenstein et al. | |
| 10,325,410 B1 | 6/2019 | Smith et al. | |
| 10,455,351 B1* | 10/2019 | Kiemele | G06F 3/167 |
| 10,475,224 B2 | 11/2019 | Liang | |
| 10,488,218 B2 | 11/2019 | Kim et al. | |
| 10,504,288 B2 | 12/2019 | Piemonte et al. | |
| 10,572,215 B1 | 2/2020 | Cooper et al. | |
| 10,585,294 B2 | 3/2020 | Youngstrom et al. | |
| 10,649,212 B2 | 5/2020 | Burns et al. | |
| 10,649,412 B2* | 5/2020 | Nixon | G06F 3/048 |
| 10,831,030 B2 | 11/2020 | Stellmach | |
| 10,831,267 B1 | 11/2020 | Golard et al. | |
| 10,853,513 B1 | 12/2020 | Ganeshmani | |
| 10,854,016 B1 | 12/2020 | Chu | |
| 11,087,553 B2 | 8/2021 | Varshney et al. | |
| 11,113,893 B1 | 9/2021 | Ma et al. | |
| 11,127,223 B1 | 9/2021 | Bhushan et al. | |
| 11,215,827 B1 | 1/2022 | Zhang | |
| 2003/0020707 A1 | 1/2003 | Kangas et al. | |
| 2003/0140088 A1* | 7/2003 | Robinson | H04L 67/325 |
| | | | 709/202 |
| 2006/0038833 A1 | 2/2006 | Mallinson et al. | |
| 2006/0174037 A1* | 8/2006 | Bernardi | H04L 63/0492 |
| | | | 709/245 |
| 2010/0287485 A1 | 11/2010 | Bertolami et al. | |
| 2011/0187746 A1 | 8/2011 | Suto et al. | |
| 2011/0197161 A1 | 8/2011 | Mattingly et al. | |
| 2011/0285704 A1 | 11/2011 | Takeda et al. | |
| 2012/0041859 A1 | 2/2012 | Vonog et al. | |
| 2012/0075343 A1 | 3/2012 | Chen et al. | |
| 2013/0083173 A1 | 4/2013 | Geisner et al. | |
| 2013/0178257 A1 | 7/2013 | Langseth | |
| 2013/0212488 A1 | 8/2013 | Scherpa | |
| 2013/0246967 A1 | 9/2013 | Wheeler et al. | |
| 2013/0293490 A1 | 11/2013 | Ward et al. | |
| 2013/0293580 A1 | 11/2013 | Spivack | |
| 2014/0002496 A1 | 1/2014 | Lamb et al. | |
| 2014/0006631 A1* | 1/2014 | Meskauskas | G06T 11/60 |
| | | | 709/227 |
| 2014/0055491 A1 | 2/2014 | Malamud et al. | |
| 2014/0063058 A1 | 3/2014 | Fialho et al. | |
| 2014/0096215 A1* | 4/2014 | Hessler | H04W 12/06 |
| | | | 726/7 |
| 2014/0204117 A1 | 7/2014 | Kinnebrew et al. | |
| 2014/0225814 A1 | 8/2014 | English et al. | |
| 2014/0225918 A1 | 8/2014 | Mittal et al. | |
| 2014/0267419 A1 | 9/2014 | Ballard et al. | |
| 2014/0320389 A1 | 10/2014 | Scavezze et al. | |
| 2015/0046296 A1 | 2/2015 | Hart | |
| 2015/0153571 A1 | 6/2015 | Ballard et al. | |
| 2015/0170256 A1 | 6/2015 | Pettyjohn et al. | |
| 2015/0179186 A1 | 6/2015 | Swierk et al. | |
| 2015/0199081 A1 | 7/2015 | Wheeler | |
| 2015/0205106 A1 | 7/2015 | Norden | |
| 2015/0206321 A1 | 7/2015 | Scavezze et al. | |
| 2015/0212703 A1 | 7/2015 | Luckett, Jr. et al. | |
| 2015/0237472 A1 | 8/2015 | Alsina et al. | |
| 2015/0248783 A1 | 9/2015 | Fayle | |
| 2015/0334562 A1 | 11/2015 | Perold et al. | |
| 2015/0356787 A1 | 12/2015 | Abe et al. | |
| 2016/0025982 A1 | 1/2016 | Sutherland et al. | |
| 2016/0026242 A1 | 1/2016 | Burns et al. | |
| 2016/0071320 A1 | 3/2016 | Smith | |
| 2016/0085773 A1 | 3/2016 | Chang et al. | |
| 2016/0116995 A1 | 4/2016 | Wilson et al. | |
| 2016/0132189 A1 | 5/2016 | Choi et al. | |
| 2016/0212138 A1 | 7/2016 | Lehane | |
| 2016/0239252 A1 | 8/2016 | Nakagawa et al. | |
| 2016/0240011 A1 | 8/2016 | Fedosov et al. | |
| 2016/0242010 A1 | 8/2016 | Parulski et al. | |
| 2016/0261658 A1* | 9/2016 | Taylor | H04L 65/4076 |
| 2016/0267285 A1* | 9/2016 | Ruben | G06K 9/00677 |
| 2016/0284128 A1 | 9/2016 | Michalscheck et al. | |
| 2017/0019768 A1* | 1/2017 | Yoon | H04L 67/52 |
| 2017/0041296 A1* | 2/2017 | Ford | G06F 21/64 |
| 2017/0068416 A1 | 3/2017 | Li | |
| 2017/0123504 A1 | 5/2017 | Kim et al. | |
| 2017/0146385 A1* | 5/2017 | Kovacs | G01G 19/50 |
| 2017/0236320 A1 | 8/2017 | Gribetz et al. | |
| 2017/0243403 A1 | 8/2017 | Daniels et al. | |
| 2017/0256096 A1 | 9/2017 | Faaborg et al. | |
| 2017/0312032 A1 | 11/2017 | Amanatullah et al. | |
| 2017/0323158 A1 | 11/2017 | Gordon | |
| 2017/0324841 A1 | 11/2017 | Clement et al. | |
| 2017/0336882 A1 | 11/2017 | Tome et al. | |
| 2017/0337745 A1 | 11/2017 | Martin | |
| 2018/0025283 A1 | 1/2018 | Kobayashi et al. | |
| 2018/0046352 A1 | 2/2018 | Johnson et al. | |
| 2018/0066956 A1 | 3/2018 | Kim et al. | |
| 2018/0083978 A1* | 3/2018 | Pantazelos | H04W 12/06 |
| 2018/0095635 A1 | 4/2018 | Valdivia et al. | |
| 2018/0095636 A1 | 4/2018 | Valdivia et al. | |
| 2018/0096507 A1 | 4/2018 | Valdivia et al. | |
| 2018/0098059 A1 | 4/2018 | Valdivia et al. | |
| 2018/0144524 A1 | 5/2018 | Lotto et al. | |
| 2018/0150892 A1 | 5/2018 | Waldron et al. | |
| 2018/0150899 A1 | 5/2018 | Waldron et al. | |
| 2018/0150903 A1 | 5/2018 | Waldron et al. | |
| 2018/0181810 A1 | 6/2018 | Jhawar et al. | |
| 2018/0182142 A1 | 6/2018 | Lim et al. | |
| 2018/0249274 A1 | 8/2018 | Lyren et al. | |
| 2018/0293103 A1* | 10/2018 | Kalmus | G06N 3/02 |
| 2018/0314889 A1 | 11/2018 | Fukazawa et al. | |
| 2018/0315248 A1 | 11/2018 | Bastov et al. | |
| 2018/0322706 A1 | 11/2018 | Drouin et al. | |
| 2018/0330515 A1 | 11/2018 | Stall et al. | |
| 2018/0345129 A1 | 12/2018 | Rathod | |
| 2018/0350144 A1 | 12/2018 | Rathod | |
| 2019/0018578 A1 | 1/2019 | Heater | |
| 2019/0026874 A1 | 1/2019 | Jin et al. | |
| 2019/0065027 A1 | 2/2019 | Hauenstein et al. | |
| 2019/0073831 A1 | 3/2019 | Kim | |
| 2019/0073832 A1 | 3/2019 | Kim | |
| 2019/0082122 A1 | 3/2019 | Singh et al. | |
| 2019/0087973 A1 | 3/2019 | Kaehler et al. | |
| 2019/0099678 A1 | 4/2019 | Khan et al. | |
| 2019/0104235 A1 | 4/2019 | Sarkar | |
| 2019/0105568 A1 | 4/2019 | Platt et al. | |
| 2019/0108578 A1 | 4/2019 | Spivack et al. | |
| 2019/0108686 A1 | 4/2019 | Spivack et al. | |
| 2019/0114051 A1 | 4/2019 | McBeth | |
| 2019/0114052 A1 | 4/2019 | McBeth | |
| 2019/0122440 A1 | 4/2019 | Barros et al. | |
| 2019/0205430 A1 | 7/2019 | Huang et al. | |
| 2019/0205645 A1 | 7/2019 | Bates et al. | |
| 2019/0237044 A1 | 8/2019 | Day et al. | |
| 2019/0251719 A1* | 8/2019 | Wang | H04W 4/026 |
| 2019/0295320 A1 | 9/2019 | Ghatak et al. | |
| 2019/0310756 A1 | 10/2019 | Vathauer et al. | |
| 2019/0310757 A1 | 10/2019 | Lee et al. | |
| 2019/0310761 A1* | 10/2019 | Agarawala | G06F 3/04817 |
| 2019/0339837 A1 | 11/2019 | Furtwangler | |
| 2019/0339840 A1 | 11/2019 | Park et al. | |
| 2019/0340816 A1 | 11/2019 | Rogers | |
| 2019/0340818 A1 | 11/2019 | Furtwangler | |
| 2019/0340833 A1 | 11/2019 | Furtwangler et al. | |
| 2019/0342632 A1 | 11/2019 | DeFaria et al. | |
| 2019/0347862 A1 | 11/2019 | Singh | |
| 2019/0347865 A1 | 11/2019 | Hackett et al. | |
| 2019/0354260 A1 | 11/2019 | Rosas et al. | |
| 2019/0354761 A1 | 11/2019 | Arshad et al. | |
| 2019/0361521 A1 | 11/2019 | Stellmach et al. | |

(56) References Cited

U.S. PATENT DOCUMENTS

| | | |
|---|---|---|
| 2019/0361797 A1 | 11/2019 | Yerli |
| 2019/0369716 A1 | 12/2019 | Chen et al. |
| 2019/0385211 A1 | 12/2019 | DeLuca et al. |
| 2020/0005026 A1 | 1/2020 | Andersen et al. |
| 2020/0012107 A1 | 1/2020 | Greenberg |
| 2020/0019295 A1 | 1/2020 | Spivack et al. |
| 2020/0028849 A1* | 1/2020 | Allen .................. H04W 12/06 |
| 2020/0028945 A1* | 1/2020 | Allen ..................... H04L 67/61 |
| 2020/0035203 A1 | 1/2020 | Kosik et al. |
| 2020/0051338 A1 | 2/2020 | Zia et al. |
| 2020/0066044 A1 | 2/2020 | Stahl et al. |
| 2020/0066045 A1 | 2/2020 | Stahl et al. |
| 2020/0066046 A1 | 2/2020 | Stahl et al. |
| 2020/0097068 A1 | 3/2020 | Hamidi-Rad et al. |
| 2020/0103962 A1 | 4/2020 | Burns |
| 2020/0111232 A1 | 4/2020 | Bleyer et al. |
| 2020/0111256 A1 | 4/2020 | Bleyer et al. |
| 2020/0117687 A1 | 4/2020 | Parulski et al. |
| 2020/0117900 A1 | 4/2020 | Deng et al. |
| 2020/0158529 A1 | 5/2020 | Zhang et al. |
| 2020/0160055 A1 | 5/2020 | Nakamura et al. |
| 2020/0204649 A1 | 6/2020 | Fowe |
| 2020/0236441 A1 | 7/2020 | Moon et al. |
| 2020/0349350 A1 | 11/2020 | Toh et al. |
| 2020/0357188 A1 | 11/2020 | Kurabayashi |
| 2020/0364900 A1 | 11/2020 | Bradski et al. |
| 2020/0374608 A1 | 11/2020 | Mazed |
| 2020/0401576 A1 | 12/2020 | Yerli |
| 2020/0409511 A1 | 12/2020 | Cowburn et al. |
| 2020/0410023 A1 | 12/2020 | Hurst |
| 2020/0410764 A1 | 12/2020 | Cowburn et al. |
| 2021/0004979 A1 | 1/2021 | Valentin et al. |
| 2021/0019947 A1 | 1/2021 | Greunke et al. |
| 2021/0042436 A1 | 2/2021 | Ganeshmani |
| 2021/0043005 A1 | 2/2021 | Arora et al. |
| 2021/0089642 A1 | 3/2021 | Kakoee et al. |
| 2021/0090315 A1 | 3/2021 | Gladkov et al. |
| 2021/0156695 A1 | 5/2021 | Zhang et al. |
| 2021/0174599 A1 | 6/2021 | Kurabayashi |
| 2021/0217324 A1 | 7/2021 | Schenk et al. |
| 2021/0240260 A1 | 8/2021 | Ronkainen et al. |
| 2021/0270621 A1 | 9/2021 | Mayster et al. |
| 2022/0051022 A1 | 2/2022 | Toh et al. |
| 2022/0124143 A1 | 4/2022 | Rafkind et al. |

OTHER PUBLICATIONS

International Search Report and Written Opinion dated Oct. 10, 2019, Patent Application No. PCT/US2019/036182, filed Jun. 7, 2019, 15 pages.

International Search Report and Written Opinion dated Oct. 21, 2019, Patent Application No. PCT/US2019/036181, filed Jun. 7, 2019, 25 pages.

* cited by examiner

SESSION-BASED INFORMATION EXCHANGE

CROSS-REFERENCE TO RELATED APPLICATIONS

This application claims the benefit of U.S. Provisional Patent Application No. 62/682,761, filed Jun. 8, 2018, and claims the benefit of U.S. Provisional Patent Application No. 62/692,557, filed Jun. 29, 2018, the disclosures of which are herein incorporated by reference in their entirety.

BACKGROUND

It has become increasingly common for an individual to carry with them, or even wear, a computing device such as a smartphone or augmented reality device. These devices may access a wide variety of information and display it to their respective users. However, sharing information between such devices and users remains problematic.

BRIEF DESCRIPTION OF THE DRAWINGS

Various techniques will be described with reference to the drawings, in which.

DETAILED DESCRIPTION

Figure 1:
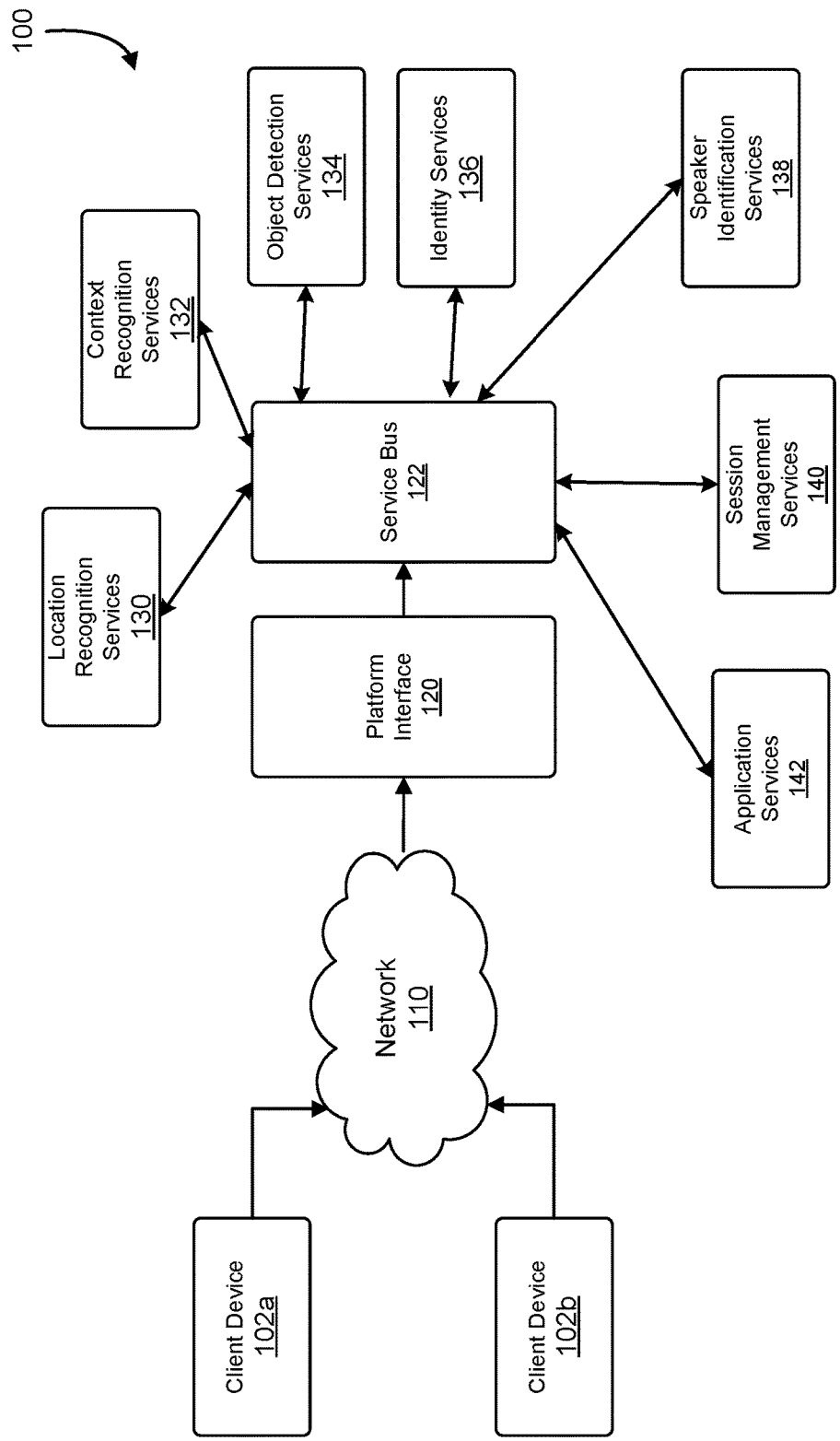
FIG. 1 illustrates an example of an information exchange service platform, in accordance with an embodiment.

Example embodiments of the techniques and systems described herein relate to sharing information between devices based on contextual information derived from the environment in which the devices are operating. Further aspects relate to identifying a mutually agreed-upon level of sensitivity for the information that is to be shared, and identifying services that may be utilized by the devices to obtain information consistent with the agreed-upon level of sensitivity.

In at least one embodiment, a system comprises at least one processor and a memory on which processor-executable instructions are stored. The instructions, in response to execution by the at least one processor, cause the system to determine to share information between a first device associated with a first entity, and a second device associated with a second entity. The first device may, in some embodiments, correspond to the system itself. The determination to share the information is based on the identification of a context in which the information sharing is authorized. A mutually agreeable level of sensitivity for the information sharing is established, and a set of services conformant to the agreed-upon level of sensitivity is identified. Information is then exchanged via the services. The information sharing is stopped when a change to the context is identified.

In at least one embodiment, the context for information sharing is based on a visual identification of one or more aspects of an environment in which one of the devices is located. For example, visual data obtained by one or more of the devices may be analyzed by the services of the platform 100 depicted in FIG. 1, in order to identify the types, classes, owners of objects observed within the environment, or to visually determine a location or class of location. A context for information sharing is then determined based on these identifications.

In at least one embodiment, a facial identity characteristic of the second entity is determined from visual data obtained by one or more of the devices. For example, visual data obtained by one or more of the devices may be analyzed by the services of the platform 100 depicted in FIG. 1, in order to identify a facial identity characteristic of the second entity. Based on this, the second entity can be identified and a context for the information sharing determined. A database of facial identity characteristics may be used to map from the identified characteristics to an identity. The database may be indexed based on the facial identity features, so that records comprising further information about an associated individual can be retrieved.

In at least one embodiment, the context for information sharing is based on a mutual goal of the entities. The mutual goal may be identified based on a variety of information, which may include the identities of objects observed in the environment, the location, and information pertaining to the entities, such as schedule information and "to do" lists.

In at least one embodiment, information sharing is adjusted, suspended, or terminated based on the detection of a change to the context in which the information was shared. For example, the system may detect that the second entity is no longer in the vicinity of the first entity. Vicinity can be determined based on being in the same room or location, within a threshold distance, and so forth. In an embodiment, the system determines vicinity with respect to goals or activities. For example, the system may determine that an information sharing context should continue while users are at a sports stadium if the activity is watching a game, even if the users are far apart. On the other hand, if the individuals are conducting a transaction, the information sharing might be discontinued when the users move a short distance apart, even if both are in the sport stadium. When the change in context occurs, the system may determine that the original basis for the information sharing no longer applies, and change or end the information sharing accordingly.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of augmented reality, by providing a framework for executing multiple applications on an augmented reality device. Moreover, techniques described and suggested in the present disclosure are necessarily rooted in computer technology in order to overcome problems specifically arising in augmented reality devices.

FIG. 1 illustrates an example of an information exchange service platform 100, in accordance with an embodiment. The platform 100 provides services 130-142 to client devices 102a-b. Examples of client devices include, but are not necessarily limited to, augmented reality ("AR") devices or virtual reality ("VR") devices. Examples of AR devices or VR devices include, but are not limited to, augmented reality headsets, goggles, glasses, smartphones, tablets, projectors, and so on. Examples of other types of client devices include, but are not limited to, laptops, tables, smartphones, or other computing devices. Software for providing AR or VR functionality may be installed on these devices, or may not be.

The platform 100 facilitates an exchange of information between the client devices 102a-b, and in particular to applications that execute on a respective one of the devices 102a-b. The services 130-142 may provide a wide variety of functions. Examples of functions that may be provided by the services include recognizing contextual information, authorizing the sharing of certain types of information based on context, and making use of the authorized information to perform various operations on behalf of the users of the platform 100. It will be appreciated that these examples are intended to be illustrative rather than limiting, and as such should not be construed so as to limit the scope of the present disclosure to only those embodiments that include the specific examples provided.

In an embodiment, the client devices 102a,b communicate with a platform interface 120 via a network 110. The communication comprises the transmission of data and events from the devices 102a,b to the services 130-142, and of data and events from the services 130-142 to the devices 102a,b.

In an embodiment, events are generated based on sensor data obtained by any one of the devices 102a,b. The sensor data is transmitted to the platform interface 120 and then provided to the service bus 122 for processing. In various aspects and embodiments, the data is processed using an iterative approach in which the services iteratively process the data along with information derived, directly or indirectly, from the data by the services. The amount of available information thus grows cumulatively with each invocation of a service. A given service may process the cumulative data a number of times, and may add additional information or context during each iteration. For example, a service for performing facial recognition might identify a person observed in a meeting room, with an initial level of confidence. Subsequently, after accessing scheduling data for the tentatively identified person, the service might increase its level of confidence in the estimate after confirming that the identified person is scheduled to attend a meeting in that meeting room.

These client devices 102a,b may, in some cases, have limited computing capacity and operating system support. For example, such devices may lack support for multitasking. In particular, support for pre-emptive multitasking or concurrent execution of application threads may be limited on some of these devices. In these cases, the platform 100 provides multitasking support. For example, applications may be executed by one or more of the services 130-142 in parallel.

Examples of the network 110 include, but are not limited to, the internet, wireless networks, ad hoc networks, optical-based networks, and so forth. These examples are intended to be illustrative, and as such should not be construed so as to limit the scope of the present disclosure to only those embodiments which include the specific example provided.

In an embodiment, one of the client devices 102a,b obtains event-related data and streams the data to the platform interface 120. The data obtained by the device can include sensor data, such as visual data, audio data, infrared data, and so forth. The data can also include events (such as those related to user input) obtained by the device, or other information obtained or generated by the device. The platform interface 120 receives the stream of data from the device and facilitates routing of the data to various services. A service bus 122, as depicted in FIG. 1, can route the data to the appropriate services for processing, and also route output from the services back to the device that generated the event.

A service bus 122 routes events and other data originating from the devices 102a,b to various services 130-142. The service bus 122, in an embodiment, employs a publish and subscribe model in which applications and services 130-142 register to receive sensor data from a device. The service bus 122 processes data received from the device, generate events based on the data, and route the generated events back to the device.

In various embodiments, the sensor data comprises visual data recorded by one or more of the client devices 102a,b. For example, the sensor data may be recorded by a video camera attached to one of the devices 102a,b.

In various embodiments, the service bus 122 employs an iterative processing technique, in which data is processed by a given service multiple times, so that the processing may be improved based on insights made by other services. This iterative approach may be implemented using a publish and subscribe model.

In an embodiment, an application launches on a client device, such as one of the client devices 102a,b. The device transmits a message announcing the new application to the platform interface 120. The device may also transmit data indicating which services the launching application wishes to employ. The platform interface 120 then uses the service bus 122 to distribute, to the various services 130-142, information indicating that a new application is starting and an indication of which services the application is requesting. The services 130-142, if they are to be used by the application, may then subscribe to events of various types for that application, which may include categories, classifications, flags, and other data indicative of the desired event types. Upon receiving event-related data, a service may process the data and route a response back to the originating device and application, in the form of an event.

In an embodiment, the platform 100 comprises location recognition services 130. These services may include services identifying the location of a user of one of the devices 102a,b, and providing location information to other services. The location recognition may be based on global positioning system ("GPS") data, wireless network data, visual recognition of an environment, location beacons, map data, and so forth. In various embodiments, the location recognition services employ a combination of techniques to form a reliable estimate of a user's location. For example, in an office environment, GPS data by itself may not be sufficient to determine which meeting room an individual is located in. However, GPS data might be combined with a map of the office environment to determine which meeting room the user is in.

In an embodiment, the location recognition services 130 performs classification of a location, instead of or in addition to determining a precise location. For example, GPS data might be used to determine that an individual is in an office building, and visual data (such as visual sensor data obtained by one of the devices 102*a,b*) used, along with the GPS data, to determine that the individual is in a meeting room. For example, a white board or conference table might be recognized in the sensor data, and used to infer a classification of the user's location. Accordingly, location information may comprise information classifying the nature of a user's location, including activities or goals commonly associated with the location.

In an embodiment, the platform 100 comprises context recognition services 132. These include services for determining the context in which information sharing is occurring, and providing information relevant to that context. This information can then be used to enhance various functions.

For example, the context recognition service may determine that the user is engaged in an information-sharing activity, such as a meeting. It may then access information about that meeting, such as a list of attendees and information about those attendees. This information can be used to improve visual recognition of individuals at the meeting, since it provides a priori knowledge of individuals likely to be present in the meeting room. The information might, in some cases and embodiments, include images of the meeting attendees, which can further improve the identification process. Reliable identification of individuals may enhance various functions, such as speaker identification.

In an embodiment, the platform 100 comprises object detection services 134. These may provide capabilities related to detecting and identifying objects in the user's environment. In embodiments, the recognition is based on visual sensor data, such as image data of a user's environment. The object detection services 134 may employ various machine learning techniques to analyze this visual data and identify objects observed in the user's environment.

In an embodiment, the platform 100 comprises identity services 136, for identifying or classifying individuals in a user's environment. For example, analysis of visual sensor data may obtain facial identity features, which are then be used to determine the identity of an individual. These techniques may be combined with information provided by the context recognition service 132, or other services, to enhance the identification of observed individuals.

In embodiments, the identity services 136 identify objects or locations. For example, identity services 136 might identify the room the user is in, classify an activity being performed (or typically performed) in the user's environment, or classify the types of objects observed in an environment. For example, the identity services 136 might identify the equipment or machinery in the user's environment.

In an embodiment, the platform 100 comprises speaker identification services 138. These services associate recorded speech with the individual who spoke. For example, an audio stream of a meeting might contain speech from several of the individuals attending the meeting. The speaker identification services 138 can correlate this data with the results of a visual analysis, in order to distinguish between the statements made by an individual with those made by others. For example, the speaker identification services 138 may analyze the video data to identify facial characteristics indicative of speech and identify the associated individual. By correlating the video data with the audio data, e.g., based on time, the speaker can be identified. The speaker identification services 138 can then produce a transcript of the audio (using various speech recognition techniques) in which the various statements included in the transcript are associated with the appropriate individuals.

In an embodiment, audio and video information is correlated by identifying visemes with phonemes. Visemes refer to visible movements of the mouth during speech. Certain frames of video in an audiovisual stream may comprise images in which mouth position or other facial characteristics that are indicative of a viseme. Phonemes refer to distinct units of sound. These may be detected in the audio portion of the audiovisual stream. Note, however, that there is not a one-to-one correlation between visemes and phonemes. Various machine learning techniques may be employed to probabilistically assign correlations between visemes and phonemes. These include hidden Markov models, naïve Bayes classifiers, and artificial neural networks. The speaker identification service 138 can observe prolonged conversations in order to estimate which individual is speaking at a given moment in time, then backtrack that information to refine prior estimates. For example, the system might have previous determined that a person that was speaking at a given time by correlating visemes and phonemes, but later determine that the person was actually yawning. In an embodiment, the speaker identification service 138 makes this second determination at a later point in the conversation by, for example, determining that the identified correlation is not associated with continued speech. The determination might also be made based on other information indicative of who was speaking, and at what time that speech occurred.

In an embodiment, the platform 100 comprises session management services 140. The session management services 140 perform, as described herein, various functions related to regulating sharing information between users, such as between the users of the client devices 102*a,b*. These may include those related session detection, selecting knowledge sets, and goal facilitation.

In an embodiment, the platform 100 comprises application services 142. These services may include those for performing various application-related functions, using data authorized for sharing during the identified session.

Figure 2:
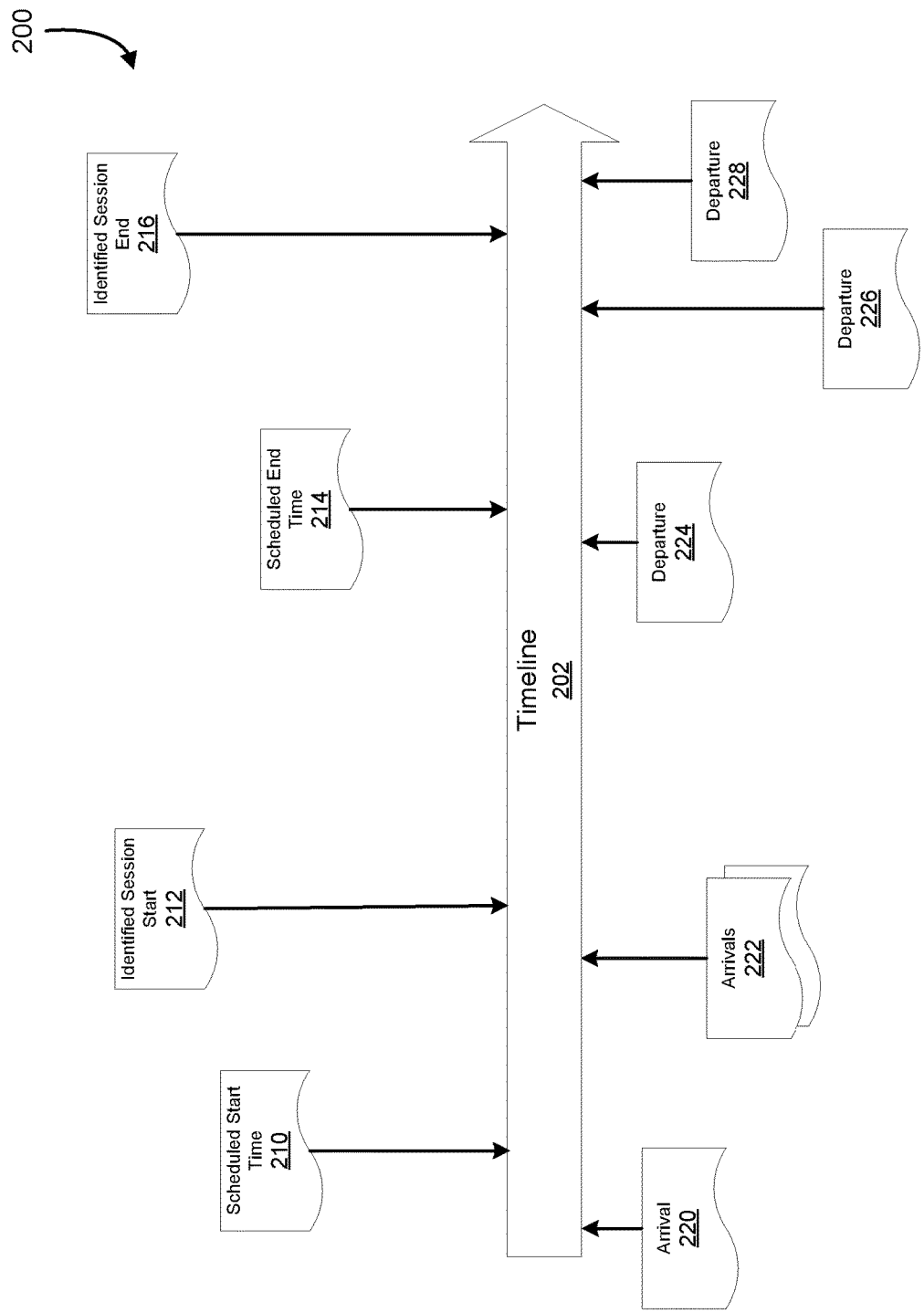
FIG. 2 illustrates an example of session detection, in accordance with an embodiment.

FIG. 2 illustrates an example of session detection, in accordance with an embodiment. Session detection may be performed, in an embodiment, by the platform 100 depicted in FIG. 1. Session detection may involve a variety of services acting in coordination, including object detection, face detection, identity detection, speaker identification, context recognition, and so forth. In an embodiment, an iterative approach is used, wherein each service contributes observations and values indicating the certainty of the observation. These observations may then be used to produce new observations associated with a greater level of certainty. This process may continue until a threshold level of certainty is reached. Note that here, the term "observation" refers to a fact, condition, state, or other quality that is believed to be true or factual as governed by an associated confidence level. For example, the identity of a participant may be described as an observation with an associated confidence level.

In the example of FIG. 2, session detection and management is performed in relation to a scheduled meeting. It will be appreciated that this example is intended to be illustrative, and as such should not be construed to limit the scope of the present disclosure to the provided example. In the example, the meeting occurs in a conference room or similar venue, and is observed by one or more augmented reality devices each comprising a range of sensors. It will be appreciated, however, that at least some of the disclosed techniques might also be applied to data collected from standalone sensors, such as a camera and microphone, or from sensors attached to or integrated with other devices, such as smartphones, projectors, tablets, video-conferencing systems, and so on.

In the example 200, the meeting occurs over a timeline 202, with a scheduled start time 210 and a scheduled end time 214. In an embodiment, such as one implemented by the platform 100 depicted in FIG. 1, information about the start and end time is obtained by context recognition services 132.

Note, however, that it may be problematic to assume that the session starts and ends precisely at a given time. For example, as depicted in FIG. 2, one participant's arrival 220 occurred prior to the scheduled start time 210. Moreover, the early-arriving participant might be conducting other business, such as conducting an unrelated phone call, reading email or otherwise be unengaged in any meeting-related activity. As such, it might be useful for the system to not associate any of these activities with the session that is about to begin. This may be the case even after the scheduled start time 210, since other participants in the meeting might arrive late.

At a second arrival time 222, additional participants arrive and, after a brief chat about unrelated matters, begin a discussion relevant to the topic of the meeting. The platform may then determine that the session has started at a point 212 subsequent to the new arrivals. The determination may be based on a combination of factors, such as 1) the observation that the scheduled start time has already occurred, that 2) a quorum of individuals scheduled to attend the meeting have arrived, 3) sentiment analysis indicates a "serious" tone to the discussion topic, and 4) content analysis indicates that subject matter relevant to the scheduled discussion topic is being discussed. As noted above, this process may be performed, using the services such as those depicted in FIG. 1, by an iterative analysis of observations and confidence levels associated with the analysis.

The platform 100 may employ a similar approach to identify when the session ends. For example, one of the participants may depart the meeting at a point 224 prior to the scheduled end time 214, but this does not necessarily indicate that the meeting has ended. Iterative analysis of observations may at this point detect, for example, that meeting related subjects are still being discussed, that a quorum of participants is still present, and so forth.

A similar analysis might determine that the session has ended at a subsequent point 216, following the scheduled end time 214, an additional departure 226 of a meeting participant, and the conclusion of various winding-down activities by the remaining participant, until his or her departure 228. For example, the remaining participant might conclude the meeting by taking notes, requesting snapshots of a whiteboard used in the meeting, and so forth. These would be included in the session, whereas subsequent activities by the remaining participant, like checking up on email or making an unrelated phone call, are determined to be irrelevant to the meeting and therefore indicative of an end to the meeting. The system may also incorporate various hard-stop features, such as those triggered by user input.

In various embodiments, knowledge and data associated with each participant is shared between various devices during the session. The shared knowledge may be displayed by the user's respective devices, uses by applications running on behalf of the users, or used to enhance the functioning of the various services. For example, shared information may be used to enhance distance detection, object detection, facial recognition, speaker identification, and audio transcript generation.

In an embodiment, voice recognition data is shared between participants during a session. For example, an artificial neural network, or other machine learning algorithm, might be pre-trained to recognize a specific individual's voice. While that user is in a meeting (or more generally, within a session), the platform might authorize use of this pre-trained network for use in speaker identification, audio transcript generation, and so on.

In an embodiment, facial recognition data is shared between participants during a session. For example, artificial neural network, or other machine learning algorithm, might be pre-trained to recognize a specific individual's face. This pre-trained network might then be made available to various services while the session is in progress.

Figure 3:
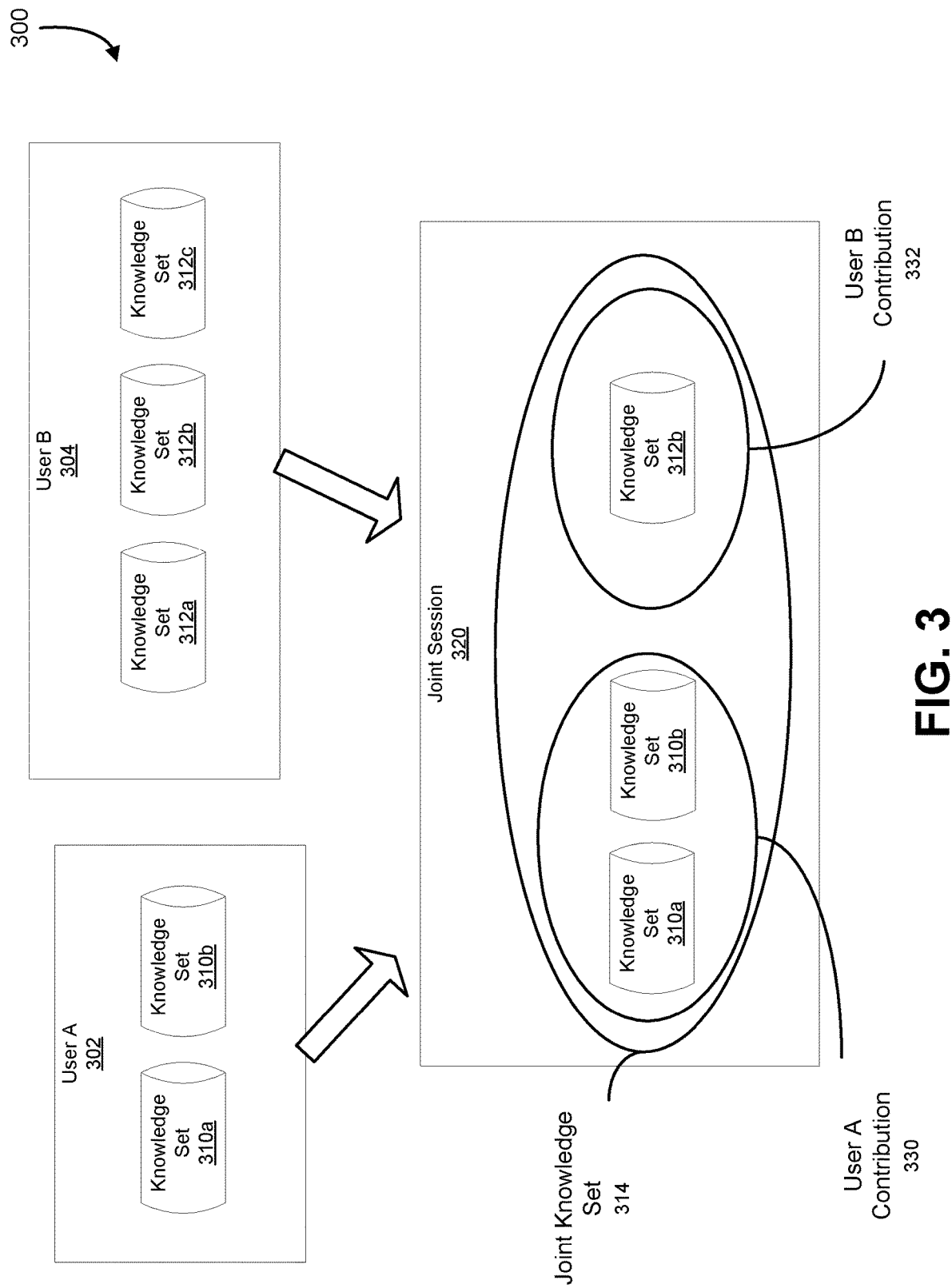
FIG. 3 illustrates an example of session-based knowledge sharing, in accordance with an embodiment.

FIG. 3 illustrates an example 300 of session-based knowledge sharing, in accordance with an embodiment. It will be appreciated that this example is intended to be illustrative, and as such should not be construed to limit the scope of the present disclosure to only those embodiments which include the example provided. In the example of FIG. 3, a joint session 320 is identified involving User "A" 302 and User "B" 304. User "A" 302 is associated with a knowledge set 310, which might comprise further subsets of knowledge 310a,b. Similarly, User "B" is associated with a second knowledge set 312, which might comprise further subsets 312a-c.

In various cases and embodiments, some or all of the knowledge sets 310, 312 are shared between devices. Here, sharing the data may refer to making the data available to the various services, such as those depicted in FIG. 1, rather than literally interchanging data. However, in some cases, e.g., regarding the sharing of contact information between meeting participants, data is exchanged between participants.

As depicted in FIG. 3, information from User A's 302 knowledge set 310 may be combined with information from User B's 304 knowledge set 312b, to form a joint knowledge set 314 consisting of contributions 330 from User A and contributions 332 from User B.

The information shared between User A 302 and User B 304 may be limited by various factors. These include, for example, privacy, licensing, consent, non-disclosure agreements, legal regulations, information indicated as private, who is participating in a session, and so forth. The platform implements policies that work to ensure that the information is shared only to the extent to which the user has authorized the sharing, and for which it is legal or ethical to share. Where appropriate, information is anonymized prior to sharing.

In an embodiment, information within the joint knowledge set 314 is provided to services operating on behalf of one or more of the session's participants. This may be performed, for example, by associating a session participant's data with one or more security identifiers indicative of owner or owners of the information. Alternatively, or in addition, the participant's data is associated with information indicative of a classification or sensitivity of the data. For example, data associated with a participant may be stored with information indicative of a context in which the information might be shared with others, or information indicative of a context in which the information cannot be shared. Embodiments may, for example, associate a set of rules or instructions with a set of data. The rules or instructions, when applied to contextual information, may generate output indicative of whether or not the set of data may be shared.

In an embodiment, control over access to information is provided by associating a classification with data in a knowledge set. For example, each of the knowledge sets 310a,b associated with User "A" 302 might be assigned a classification. Likewise, each of the knowledge sets 312a-c associated with User "B" 304 might be assigned a classification. Context for information sharing within the context of a session is then determined. The aforementioned rules or instructions may then be applied to determine which of the knowledge sets from each user should be shared. Those identified as such may then be accessed as a joint knowledge set 314. Services operating on behalf of User "A" 302, User "B" 304, or both User "A" and User "B," may access data in the joint knowledge set 314.

In an embodiment, the session management services 140 provides control over access to information between the session's participants, by implementing the aforementioned operations.

In an embodiment, the joint knowledge set 314 comprises facial recognition data associated with one or more of the participants. Facial recognition data may include data indicative of facial identity features, including but not limited to those suitable for speaker identification tasks, data for configuring a neural network to perform a facial recognition task, and so forth.

In an embodiment, the joint knowledge set 314 comprises voice recognition data associated with one or more of the participants. Voice recognition data may include qualitative or quantitative data regarding a participant's voice, including but not limited to data relevant to making a speaker identification. Other examples include data for configuring a neural network pre-trained to recognize the participant's voice.

In an embodiment, the joint knowledge set 314 comprises information about the participants in the session, such as email addresses, phone numbers, schedule information, and so forth.

In an embodiment, the joint knowledge set 314 comprises information about the sizes of people in the session, or objects that may be observed in the environment in which the session is taking place. This information may be used to improve distance determination and object recognition. For example, in an embodiment, a cost function used in association with a machine learning algorithm for object detection might incorporate information about the known size of on observed object to improve a determination regarding the real-world distance to the object. Such information might also be combined with other information, such as a physical measurement taken by a rangefinder or other sensor. Improved estimation of size or distance can be further utilized in other applications, including but not limited to speaker detection.

In an embodiment, the joint knowledge set 314 comprises information determined to be pertinent to a goal or subject relevant to the session. For example, documents or other information relevant to the purpose of the meeting might be placed, presuming authorization by the owner-participant, into the joint knowledge set 314.

In various embodiments, the information is shared between participants at varying levels before, during, or after a session. Put another way, the information that is included in the joint knowledge set 314 may vary over time.

Figure 4:
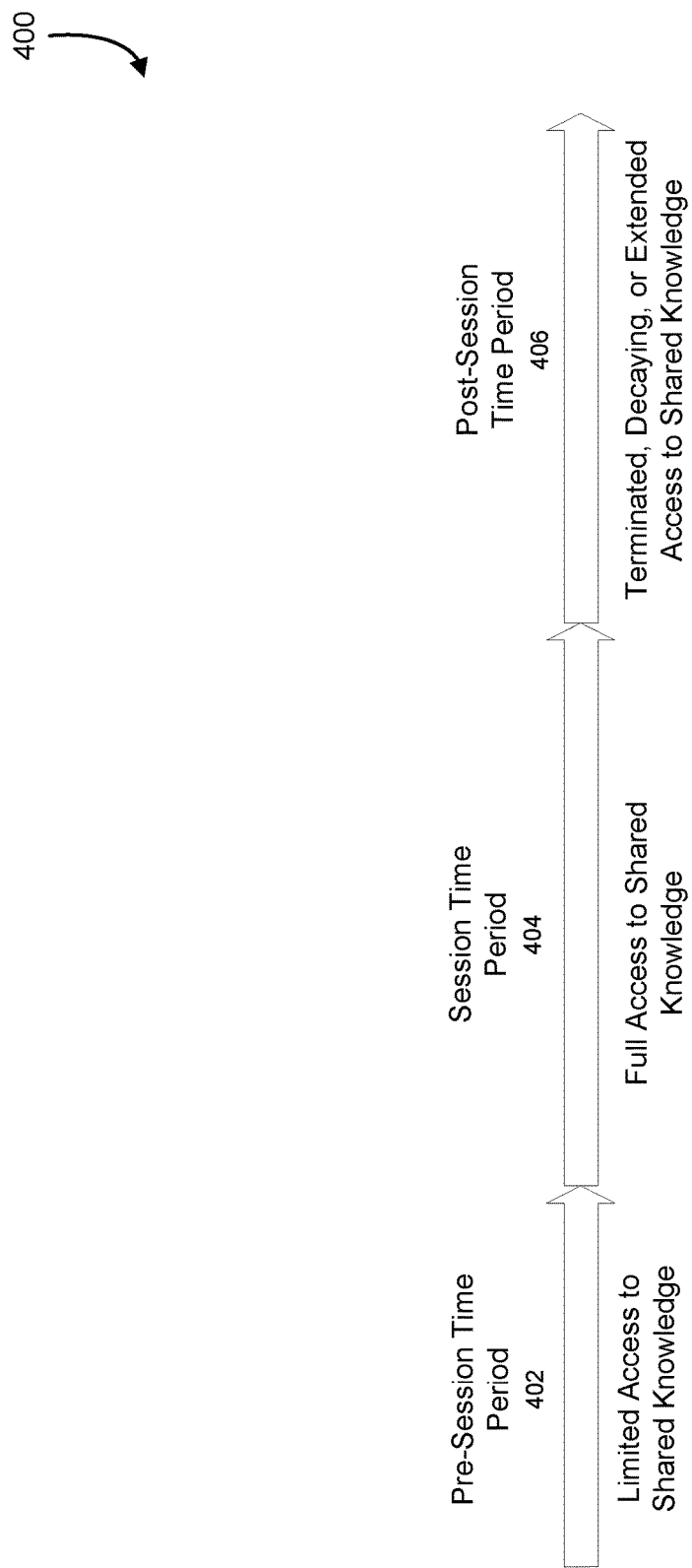
FIG. 4 illustrates example aspects of session-based knowledge sharing, in accordance with an embodiment.

FIG. 4 illustrates example aspects of session-based knowledge sharing, in accordance with an embodiment. In the example 400, a timeline consists of a first period 402 prior to a session, a second period 404 during the session, and a third period 406 following the session.

In an embodiment, information is shared between session participants, hypothetical session participants, and/or designated non-participants. For example, selected information might be included in a joint knowledge set shared between the invitees to a meeting. This might include, for example, information considered preliminary to the meeting, such as basic biographical information, contact information, and general background information. This period of time is indicated in FIG. 4 by the "pre-session" time period 402.

In an embodiment, the joint knowledge set 314 includes a complete set of shareable information during the time period 404 in which the session is occurring. Note that "complete" does not refer to all available information. Rather, it refers to information that has been determined to be acceptable to share in the context of the session, e.g., information in the joint knowledge set 314. Information not included in this set is never shared. During the other time periods 402, 406, the amount of information in the joint knowledge set 314 may be reduced compared to what is available during the session.

In an embodiment, access to information is terminated, modified, or extended during the period 406 following the session. For example, some information might be made permanently shareable, such as a participant's email address or phone number. Other information, such as notes summarizing the meeting, or a document that was the subject of discussion during the meeting, might be made permanently available, or made available for a limited period of time. Access to other types of information, such as voice recognition or facial identification information, might be terminated immediately following the end of the meeting.

In an embodiment, a record of the joint knowledge set is created, and over time information is added or removed from the set. When a service wishes to make use of the information, the record may be accessed to determine if the information is in the joint knowledge set. For example, with respect to FIG. 1, a service may interface with the session management services 140 to request information in the joint knowledge set. The session management service may grant the request and provide the information if it confirms that the information is still in the joint knowledge set, or refuse the request if it is not.

In an embodiments, information sharing in a session incorporates the application of speaker detection techniques. Speaker detection services may, for example, be a component of a platform for augmented reality services, such as the platform 100 depicted in FIG. 1.

Figure 5:
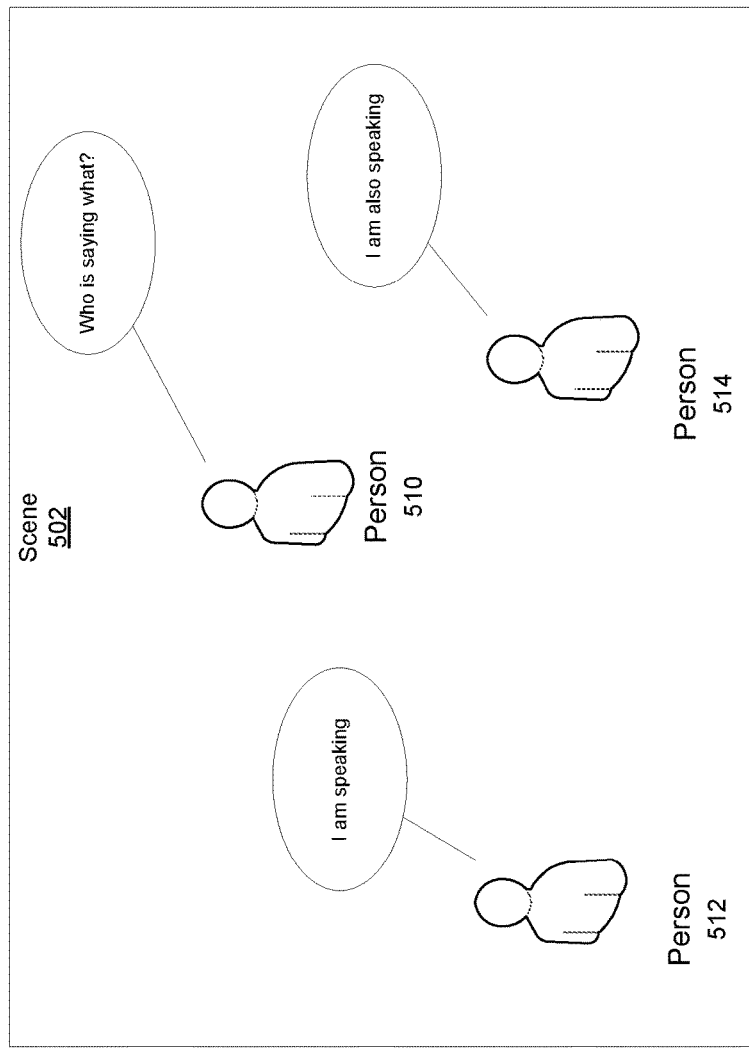
FIG. 5 illustrates aspects of speaker detection and identification, in accordance with an embodiment.
Figure 5:
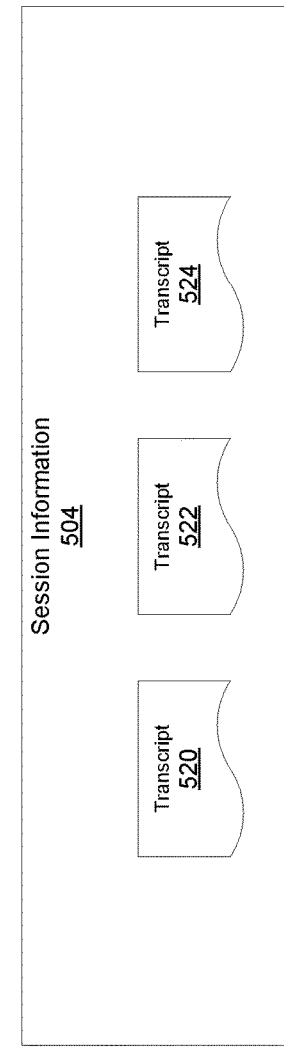

FIG. 5 illustrates aspects of speaker detection and identification, in accordance with such an embodiment. In the example 500 of FIG. 5, speaker detection involves determining the identity of a speaker observed in recorded visual data, as might be obtained from an augmented reality device. The visual data may represent a scene 502 which comprise three persons 510, 512, 514, each of which might be speaking at any given time. At some times they may speak in turn, while at other times their speech may overlap.

The platform 100, as depicted in FIG. 1, may provide services enabling the identification of each speaker. The services may further include a transcript service, such that one or more transcripts 520, 522, 524 are generated. A transcript represents the statements made by the persons 510, 512, 514. A goal of speaker detection is to improve the accuracy of such transcripts, so that statements recorded in the transcript are attributed to the right person.

The session information 504 may include the transcripts 520-524. In embodiments, the session information 504 also includes additional information that may be shared between devices and services acting on behalf of the participants, including information that may assist the devices and services to perform tasks such as speaker identification.

Figure 6:
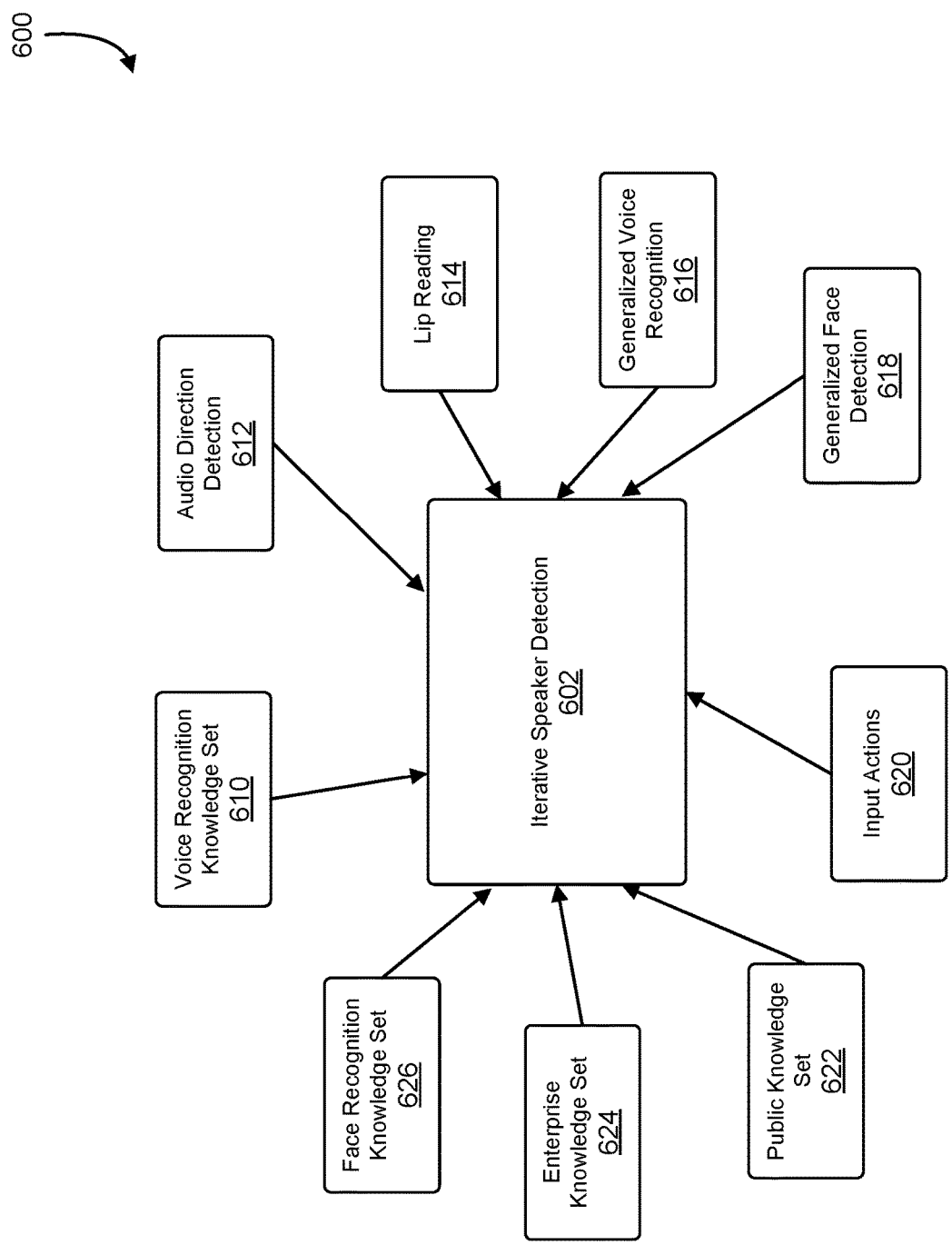
FIG. 6 illustrates aspects of operations for speaker detection and identification, in accordance with an embodiment.

FIG. 6 illustrates aspects of operations for speaker detection and identification, in accordance with an embodiment. In the example 600, an iterative speaker detection module 602 performs an iterative process for identifying a current speaker. A module, as used herein, refers to processor-executable instructions, at least some of which have been loaded into the memory of a computing device, that when executed by a processor of the computing device, cause the computing device to perform the described functions of the module.

In an embodiment, the operation of the iterative speaker detection module 602 proceeds as follows. First, visual and audio information is captured. The visual information may, in cases and embodiments, include representations of each person to whom the speaker identification may apply. The audio information, in cases and embodiments, includes representations of the speech made by some or all of the persons to whom the speaker identification may apply. It is a goal of the speaker detection process to correlate the identities of the individuals to the speech made by a particular person. Next, the occurrence of speech is detected. This stage may or may not include determining the content of the speech. An initial estimate of the speaker is then determined. For example, the speaker detection module 602 might compute an attribution vector for a given period in which speech is occurring. This attribution vector might comprise an entry for each individual, to represent an estimated probability that the corresponding individual is speaking during a given period. Then, using an iterative processing technique, the estimates are refined until a sufficient confidence level is reached. The content of the speech might then be determined and associated with the individual deemed to be the likely speaker. Note that although the previous algorithm has been described in a particular order, the described order should not be construed as limiting the scope of the present disclosure to only those embodiments that perform the described operations in the order described. For example, except where logically required, embodiments may omit or alter certain steps, perform the steps in a different order, or perform the steps in parallel.

In an embodiment, a generalized voice recognition module 616 detects the occurrence of speech. The module is not specifically trained to recognize individual speakers, but rather to detect the occurrence of speech in an audio signal. In some instances, this function may be performed based in whole or in part on visual information, for example based on output from a "lip reading" module 614. Although such techniques may be relatively poor at determining the content of speech, they may be suitable for detecting the occurrence of speech, and have the advantage of providing high confidence regarding the person who is the source of the speech. Likewise, audio-based voice recognition algorithms may be selected based on their reliability and/or efficiency at detecting the occurrence of speech, rather than the content of speech.

In an embodiment, an audio direction detection module 612 identifies the direction an audio signal is originating from. The module 612 may base the identification on input from a stereo microphone, or alternatively from audio signals shared between client devices. The sharing may include sharing of data received by and stored remotely.

In an embodiment, a generalized face detection module 618 detects faces within the captured visual information. This module may be selected based on its accuracy and efficiency in detecting the presence of a face, rather than its ability to identify a particular face. The presence of a face in the image can be correlated with other information, such as audio direction, to improve an estimate of speaker location.

In an embodiment, an estimate of speaker location is used by the iterative speaker detection module 602 to associate an identity with the speaker. For example, an enterprise knowledge set 624 may provide information useful in assigning an identity to the speaker. This information can include personnel records usable for identity determination, such as photographs of an employee, the employee's name, and so forth. In some embodiments, the enterprise knowledge set may include data to configure an artificial neural network pre-trained to recognize the employee.

In an embodiment, input actions 620 provide information to the speaker detection process. For example, a user might take an action indicating that he or she wishes to speak, e.g. by taking control of a virtual microphone. Information such as when the action was taken might be correlated with other info to increase the system's confidence that an identified person is speaking.

In an embodiment, a public knowledge set 622 provides capabilities similar to that of the enterprise knowledge set, but using public data sources.

In an embodiments, a face recognition knowledge set 626 is used in the iterative speaker detection process. The face recognition knowledge set may include data for configuring a neural network trained to recognize an individual. For example, a neural network might be pre-trained to recognize an individual based on facial characteristics. Data for reconstituting this neural network can then be stored and made available as part of the face recognition knowledge set. This can include data for neural networks pre-trained to identify particular faces, such as the face of the user from which the data is obtained.

Similarly, in some embodiments, a voice recognition knowledge set 610 may include data for configuring a neural network pre-trained to recognize voices. This can include data for a neural network trained to identify a particular voice, such as the voice of the user from which the data is obtained.

Note that in many instances the data used by the iterative process depicted in FIG. 6 is obtained through knowledge sharing, such as the knowledge sharing depicted in FIG. 3. For example, during a session the facial recognition and voice recognition data for each participant might be shared, so that each participant's voice can be better recognized using all of the available data. This data would normally belong only to the respective owner, but is shared temporarily during the session to enhance speaker recognition.

Figure 7:
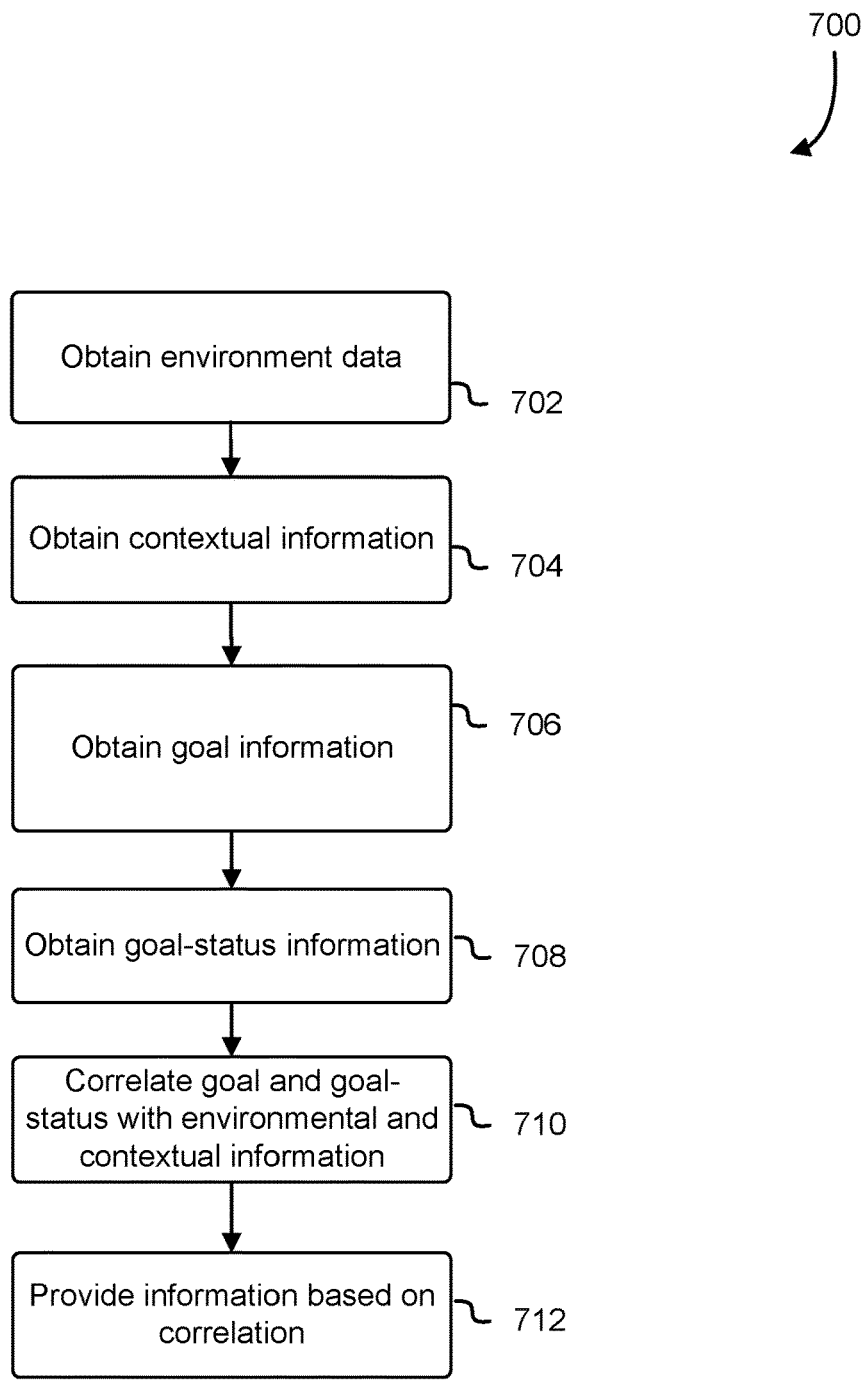
FIG. 7 is a flowchart that illustrates an example procedure for goal facilitation, in accordance with an embodiment.

As described herein, information may be included in a joint knowledge set in order to facilitate accomplishment of a goal. FIG. 7 is a flowchart that illustrates an example procedure for goal facilitation, in accordance with an embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 8:
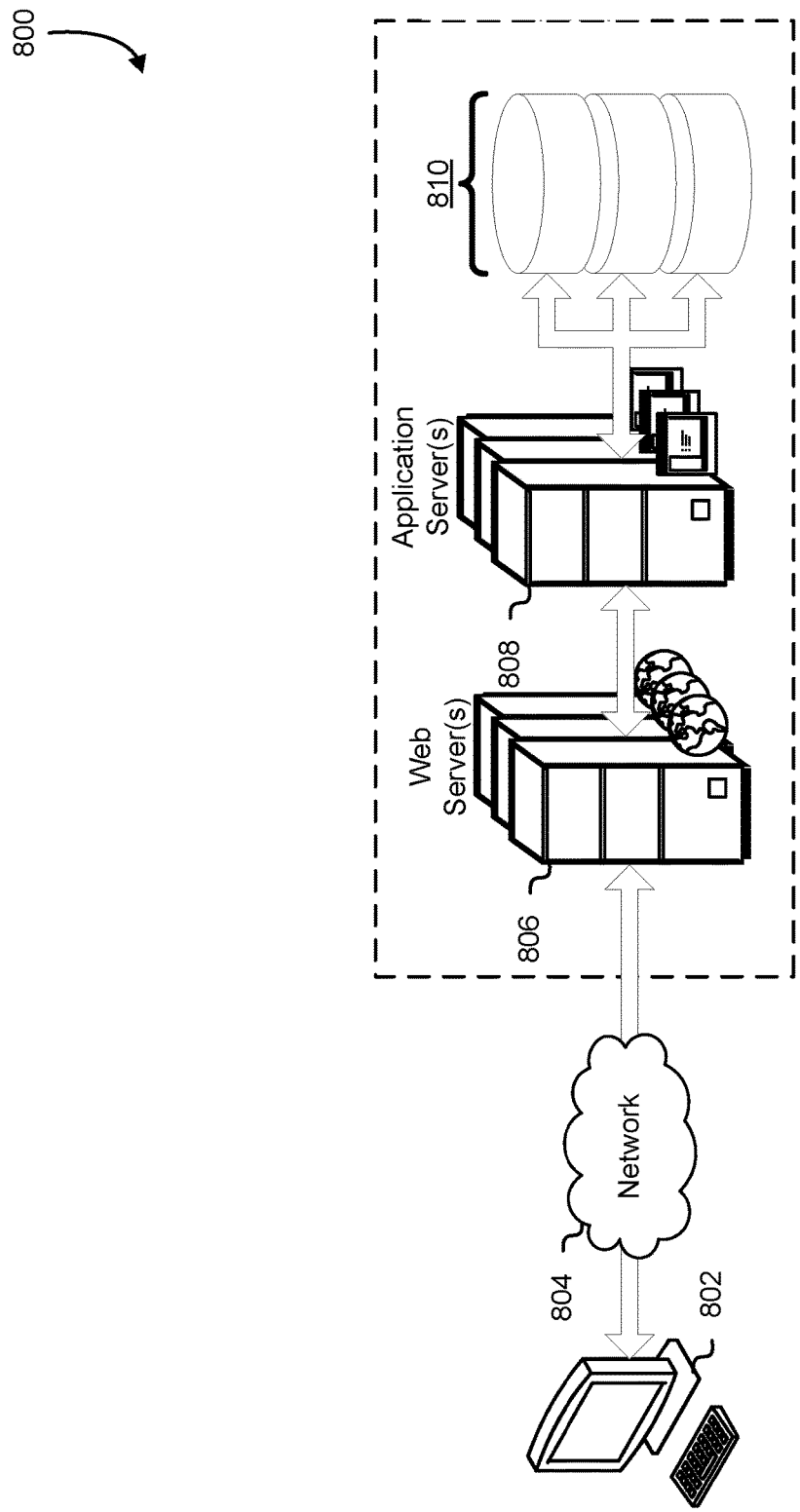
FIG. 8 illustrates an environment in which various embodiments can be implemented.

For example, some or all of process 700 may be performed by a client device, such as an augmented reality device comprising a non-transitory computer-readable storage medium on which executable instructions are stored, and one or more processors capable of executing the instructions. In some embodiments, the device may work in conjunction with remote services provided by a server in a data center. For example, the augmented reality device may perform some functions using various components of the platform 100 described in conjunction with FIG. 1, and/or in conjunction with a remote service, such as one or more web servers 806 or the one or more application servers 808, as depicted in FIG. 8.

The process 700 includes a series of operations wherein interaction with objects in the user environment is enhanced based on user goals and goal status information.

At 702, the device obtains environmental data. This may include visual data taken from cameras trained on the user's environment, audio data taken from microphones in the user's environment, and so on. Alternatively, location data is obtained. The location data may include GPS data, data from a beacon indicating a location within a building, and so on.

At 704, the device obtains contextual information. In an embodiment, obtaining contextual information comprises identifying objects within the user's environment and obtaining further information based on the identification of the objects. For example, a goal or activity might be inferred from the presence of the identified objects.

At 706, the device obtains information about the user's goal or activity. This comprises gathering contextual information related to the goal or activity. For example, in an embodiment, related services are identified. These may include services to facilitate accomplishment of a goal, or services to enhance participation in an activity.

At 708, the augmented reality device obtains goal-status information. This information relates to the steps or components associated with accomplishing the goal. In the case of activities, it may relate to steps or components for enhancing the participant's engagement in the activity. Status refers to which of these steps or components have been performed, accomplished, or acquired.

In an embodiment, goals and goal status are shared by multiple participants, such as the participants in an information sharing session. Embodiments may evaluate the status of a goal or activity in view of data from each of the participants. For example, some components needed for accomplishment of the goal may have been accomplished by one participant, while another participant may have acquired other needed components.

At 710, the augmented reality device correlates the goal and goal-status information with the environmental and contextual information. In an embodiment, current goals and goal status are evaluated with respect to the user's environment, to determine if the user's environment is conducive to completing any of the current goals.

At 712, the device provides information based on the correlation. In an embodiment, an augmented reality device generates a display to include information indicating what actions are available to the user to further accomplishment of some pending goal. For example, the augmented reality device might display information in the augmented reality scene to indicate that a product or service related to the goal or activity is available.

The algorithm of FIG. 7 can be applied to various scenarios. In one example, the algorithm is applied to the resolution of jointly held goals within an information sharing session. For example, an information sharing session might be conducted over the course of a meeting. In response to determining that the meeting has begun, the platform might obtain contextual information indicating what the purpose of the meeting is, and what steps or actions might need to be taken to accomplish the meeting's goals. For example, the platform might identify action items relevant to the meeting, and set, as a group goal, the accomplishment of those action items. The platform might then provide the participants with information and services helpful to the accomplishment of those goals.

In an embodiment, the assistance provided by the platform is based on the participant's environment. For example, after the meeting, a participant might return to his or her office and be reminded, by the platform, of an action item that might be best accomplished while at that location.

In another example, the algorithm of FIG. 7 is applied to the acquisition of goods and services relevant to project completion. For example, two individuals might be cooperating to prepare a meal. One of those individuals may have partially acquired the ingredients needed to prepare the meal. So that the goal can be completed in a coordinated fashion, the other user might be notified of what ingredients have been acquired, and which have not. That user can then be notified when entering an environment in which the missing ingredients might be acquired.

In an embodiment, an augmented reality device determines that a user is proximate to a store, or location within a store, this is related to the accomplishment of the goal. Embodiments may, for example, use machine learning techniques to identify a store front or store kiosk. Having done so, the system can then acquire information indicative of products or services available in the current environment. For example, if a store front is identified, a catalog of products or services associated with the store can be accessed.

Continuing the example of meal preparation, when one of the users passes by a grocery store—for example, when commuting home from work—that individual's augmented reality device may 1) determine that the individual is approaching a supermarket, 2) identify products and services available at the supermarket: 3) determine that the product or service is associated with one of the individual's goals, in this case preparing the meal, and 4) determine that the goal can be advanced using the supermarket's available products or services. The augmented reality device may then display, to the user, information indicating that accomplishment of the goal can be furthered by visiting the location.

In another example, the algorithm of FIG. 7 is applied to product inspection. The user of a device, such as an augmented reality device, may have a general goal of inspecting products in order to ensure that the inspected products comply with various regulations. As the user is inspecting various products, the device may identify the type of product, retrieve relevant regulatory information, identify qualities of the product relevant to the retrieved regulations, and provide signals regarding compliance, non-compliance, or further steps that might be taken to further the goal of ensuring compliance.

In an embodiment, modal interactions with objects in the augmented reality scene are modified based on actions identified as potentially useful in accomplishing a goal. Continuing the example of product inspection, various features of the inspected product may be identified and marked with cursors indicative of potential actions. For example, an area of the product might be marked in the augmented reality scene with graphics indicating that a close visual inspection of the area should be conducted. The user may then perform a gesture causing the mode of the cursor to change, e.g., to a "magnifying glass mode" in which the close visual inspection can be conducted. Relevant observations can then be made, and relevant features tagged using a secondary cursor.

In another example, the algorithm of FIG. 7 is applied to facilitate quality improvement in an assembly line. In an embodiment, a joint knowledge set is created regarding quality metrics for a product being assembled. Users of a device, such as an augmented reality device, are presented with information regarding quality metrics. The information may include status information regarding which metrics have not yet been inspected, and which quality metrics have been inspected, and including the results of that inspection. For metrics that have failed, users at a different point in the assembly line are notified of steps that may be taken to complete the inspection or to correct a previously noted failed metric.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 800 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 8. Thus, the depiction in FIG. 8 should be taken as being illustrative in nature and not limiting to the scope of the disclosure.

The network 804 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 804 are well known and will not be discussed in detail. Communication over the network 804 can be enabled by wired or wireless connections and combinations thereof. In an embodiment, the network 804 includes the Internet and/or other publicly addressable communications network, as the environment 800 includes one or more web servers 806 for receiving requests and serving content in response thereto, although for other networks an alternative device serving a similar purpose could be used as would be apparent to one of ordinary skill in the art.

The illustrative environment 800 includes one or more application servers 808 and data storage 810. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 808 can include any appropriate hardware, software and firmware for integrating with the data storage 810 as needed to execute aspects of one or more applications for the electronic client device 802, handling some or all of the data access and business logic for an application. The one or more application servers 808 may provide access control services in cooperation with the data storage 810 and is able to generate content including, text, graphics, audio, video, and/or other content usable to be provided to the user, which may be served to the user by the one or more web servers 806 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 802 may be processed by the electronic client device 802 to provide the content in one or more forms including forms that are perceptible to the user audibly, visually, and/or through other senses. The handling of all requests and responses, as well as the delivery of content between the electronic client device 802 and the one or more application servers 808, can be handled by the one or more web servers 806 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 810 can include several separate data tables, databases, data documents, dynamic data storage schemes, and/or other data storage mechanisms and media for storing data relating to a particular aspect of the present disclosure. For example, the data storage 810 may include mechanisms for storing various types of data and user information 816, which can be used to serve content to the electronic client device 802. The data storage 810 also is shown to include a mechanism for storing log data, such as application logs, system logs, access logs, and/or various other event logs, which can be used for reporting, analysis, or other purposes. It should be understood that there can be many other aspects that may need to be stored in the data storage 810, such as page image information and access rights information, which can be stored in any of the above listed mechanisms as appropriate or in additional mechanisms in the data storage 810. The data storage 810 is operable, through logic associated therewith, to receive instructions from the one or more application servers 808 and obtain, update, or otherwise process data in response thereto. The one or more application servers 808 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 808.

In one embodiment, a user, through a device operated by the user, can submit a search request for a match to a particular search term. In this embodiment, the data storage 810 might access the user information to verify the identity of the user and obtain information about items of that type. The information then can be returned to the user, such as in a results listing on a web page that the user is able to view via a browser on the electronic client device 802. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 804. These devices also can include virtual devices such as virtual machines, hypervisors, and other virtual devices capable of communicating via the network 804.

Various embodiments of the present disclosure utilize the network 804 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 804 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 806, the one or more web servers 806 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 800 can include a variety of data stores and other memory and storage media as discussed above. These can reside in a variety of locations, such as on a storage medium local to (and/or resident in) one or more of the computers or remote from any or all of the computers across the network 804. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A system, comprising:
   at least one processor; and
   a memory having stored thereon executable instructions that, in response to execution by the at least one processor, cause the system to:
   determine to share information between a first device associated with a first entity and a second device associated with a second entity, the determination based at least in part on identification of a context in which sharing information is authorized, wherein the context is based at least in part on a visual identification of one or more aspects of an environment in which at least one of the first device or the second device is operating and indicates a mutual goal of the first and second entities, wherein the determination is further based at least in part on a correlation between the mutual goal and the environment, wherein the visual identification of the one or more aspects of the environment is based at least in part on visual data obtained from at least one of the first device or the second device;
   identify one or more services available to provide information associated with the first entity to the second device, the one or more services identified based at least in part on a level of sensitivity associated with the identified context;
   provide the information to the second device, based at least in part on the correlation and the one or more services; and
   stop further sharing of the information in response to a change to the context of the information sharing.

2. The system of claim 1, wherein the visual identification is based at least in part on identification of a facial characteristic of the second entity, the identification of the facial characteristic based at least in part on image data obtained by the system.

3. The system of claim 1, wherein the memory has stored thereon executable instructions that, in response to execution by the at least one processor, cause the system to:
   retrieve, from a database indexed by facial identity features, information pertaining to the second entity.

4. The system of claim 1, wherein the one or more services are identified based at least in part on the mutual goal of the first and second entities.

5. The system of claim 1, wherein the memory has stored thereon executable instructions that, in response to execution by the at least one processor, cause the system to:
   detect that the second entity is no longer in a vicinity of the first entity; and
   determine that the context of the information sharing has changed based at least in part on the detection.

6. The system of claim 1, wherein the context is determined based at least in part on location and schedule information associated with the first entity.

7. The system of claim 1, wherein the visual identification is based at least in part on an observation by at least one of the first device or the second device of a session associated with information sharing between a plurality of entities.

8. A processor-implemented method, comprising:
   determining to share information between a first device associated with a first entity and a second device associated with a second entity, the determination based at least in part on a determination of a context of the information sharing wherein the context based at least in part on visual identification of an aspect of an environment in which at least one of the first or second devices is operating and an indication of a mutual goal of the first and second entities, the determination to share information being based at least in part on a correlation between the mutual goal and the environment, wherein the visual identification of the aspect of the environment is based at least in part on visual data obtained from at least one of the first or second devices;
   identifying one or more services available to provide information associated with the first entity to the second device, the one or more services identified based at least in part on the context of the information sharing;
   providing the information to the second device, based at least in part on the correlation the one or more services; and
   stopping additional sharing of the information in response to a change to the context of the information sharing.

9. The processor-implemented method of claim 8, wherein the identifying of the context is based at least in part on a visual identification of a facial characteristic of the second entity, the visual identification based at least in part on image data obtained by the first device.

10. The processor-implemented method of claim 8, wherein the visual identification is based at least in part on image data obtained by the first device.

11. The processor-implemented method of claim 8, further comprising: determining, between the first and second devices, a mutually agreed level of information sharing; and
   identifying the one or more services available to provide information associated with the first entity to the second device, based at least in part on the mutually agreed level of information sharing and the mutual goal.

12. The processor-implemented method of claim 8, further comprising:
   retrieving, from a database indexed by facial characteristics, information pertaining to the second entity.

13. The processor-implemented method of claim 8, further comprising:
   determining that the context has changed based at least in part on a determination that the second entity is no longer within a vicinity of the first entity.

14. The processor-implemented method of claim 8, wherein the context is determined based at least in part on at least one of a location of the first entity or a schedule of the first entity.

15. The processor-implemented method of claim 8, wherein the change in context is determined based at least in part on accomplishment of the mutual goal.

16. A non-transitory computer-readable storage medium having stored thereon executable instructions that, in response to being executed by one or more processors of a computing device, cause the computing device to at least:
- determine to share information between a first device associated with a first entity and a second device associated with a second entity, the determination based at least in part on determination of a context of the information sharing wherein the context is based at least in part on a visual identification of one or more aspects of an environment in which at least one of the first or second devices is operating and indicative of a mutual goal of the first and second entities, the determination being based at least in part on a correlation between the mutual goal and the environment, wherein the visual identification of the one or more aspects of the environment is based at least in part on visual data obtained from at least one of the first or second devices;
- identify one or more services available to provide information associated with the first entity to the second device, the one or more services identified based at least in part on the context of the information sharing, including the mutual goal;
- provide the information to the second device, based at least in part on the correlation and the one or more services; and
- terminate the information sharing in response to a change to the context of the information sharing, the change in context indicating that further sharing of information should be discontinued.

17. The non-transitory computer-readable storage medium of claim 16, wherein the context is determined based at least in part on visual data obtained by the first device.

18. The non-transitory computer-readable storage medium of claim 16, wherein the one or more services are selected based at least in part on the one or more services being capable of providing a mutually agreed level of information sharing, the mutually agreed level of information sharing determined based, at least in part, on the mutual goal.

19. The non-transitory computer-readable storage medium of claim 16, having stored thereon further executable instructions that, in response to being executed by one or more processors of an augmented reality device, cause the computing device to at least:
- receive an indication that the context has changed, based at least in part on a determination that the first entity is no longer within a vicinity of the second entity.

20. The non-transitory computer-readable storage medium of claim 16, wherein the context is determined based at least in part on at least one of a location of the first device, schedule information for the first entity, information indicative of an object recognized in visual data obtained by first device, or information indicative of a person recognized in visual data obtained by the first device.

* * * * *

UNITED STATES PATENT AND TRADEMARK OFFICE
CERTIFICATE OF CORRECTION

| | | |
|---|---|---|
| PATENT NO. | : 12,003,585 B2 | Page 1 of 1 |
| APPLICATION NO. | : 16/435399 | |
| DATED | : June 4, 2024 | |
| INVENTOR(S) | : Richard Earl Simpkinson et al. | |

It is certified that error appears in the above-identified patent and that said Letters Patent is hereby corrected as shown below:

On the Title Page

Column 1, item (71):
"Applicants: Vulcan Inc., Seattle, WA (US); Jo Lynn Allen"

Should read as:
--Applicant: Vulcan Inc., Seattle, WA (US)--

Signed and Sealed this
Fourteenth Day of January, 2025

Derrick Brent
*Acting Director of the United States Patent and Trademark Office*